UNITED STATES PATENT OFFICE

OTTO NICODEMUS AND WALTER SCHMIDT, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

PROCESS OF SEPARATING PRIMARY FROM SECONDARY ALIPHATIC AMINES

No Drawing. Application filed February 28, 1930, Serial No. 432,258, and in Germany March 12, 1929.

The present invention relates to a process of separating primary from secondary aliphatic amines.

We have found that primary aliphatic amines can be easily separated in a technically well practicable manner from secondary aliphatic amines and that both amines can be obtained in a pure form by using benzaldehyde or a higher boiling aromatic aldehyde as a separating agent. The aldehyde is condensed only with the primary amines so as to form a benzylidene compound from which the non-attacked secondary base can easily be distilled off. The benzylidene compound thus obtained is then easily split in the heat, by the addition of a mineral acid, into aldehyde and primary amine. For this purpose strong mineral acids may be used which under the conditions of the reaction have no oxidizing effect upon the amines, such as sulphuric acid, hydrochloric acid, phosphoric acid. By water vapor distillation, for instance, the aldehyde used is recovered nearly quantitatively whilst the pure primary amine can either be separated as a salt from the mineral acid solution or quantitatively be recovered as a base after addition of an alkali.

The combination of these chemical operations allows of easily and quantitatively separating primary and secondary aliphatic bases by means of a process which can practically be carried out at low costs. Furthermore we have found that primary aliphatic amines can be separated in the same manner from tertiary amines or from mixtures of secondary and tertiary amines.

The following examples serve to illustrate our invention, but they are not intended to limit it thereto:

(1.) 5 kilos of benzaldehyde are added to 8 kilos of a mixture containing monoethylamine with diethylamine and 18 per cent of hydrocarbons. The self-heating liquid is then subjected to the distillation; 5.9 kilos of a limpid product containing 78 per cent of diethylamine and 20 per cent of hydrocarbons are distilled at 50° C. to 70° C. The mixture consisting of benzylidene ethylamine, water and impurities which remains in the still is then heated with 6 kilos of sulphuric acid of 50 per cent strength, while simultaneously conducting water-vapor through the liquid, at which operation 4.7 kilos of benzaldehyde are recovered by the water-vapor distillation. As soon as the steam distillation is complete, the sulphuric solution is caused to run into an excess of alkali and the monoethylamine which is set free is distilled off. By a liquefaction of the vapors of the base by means of a low cooling process 1.92 kilos of liquid ethylamine of 98 per cent strength are obtained.

In an analogous manner methylamine and dimethylamine can be separated, but in the presence of ammonia the loss of benzaldehyde is more perceptible. Contrary thereto the separation of primary butylamine from secondary butylamine is very easily effected yielding 95 to 96 per cent of primary and secondary amine as well as recovered benzaldehyde.

(2.) 135 grams of para-toluylaldehyde are added to a mixture containing 45 grams of ethylamine and 100 grams of diethylamine. The whole is then subjected to the distillation. After all of the diethylamine is distilled at a temperature from 52° C. to 60° C., the remaining aldehyde compound is split by water-vapor distillation in the presence of sulphuric acid. The aldehyde is recovered from the distillate while the base remains in the vessel in form of its sulphate and is liberated from the sulphate by the addition of alkali and 40 grams of ethylamine are recovered by distillation and condensation by a low cooling process.

(3.) 160 grams of β-naphthaldehyde are added to an analogous mixture of bases as that of Example 2 and the whole is further treated as described therein. Thus 95 grams of diethylamine and 42 grams of ethylamine are isolated and 85 per cent of the β-naphaldheyde used are recovered.

(4.) 215 grams of benzaldehyde are added to a mixture containing 90 grams of ethylamine and 150 grams of triethylamine. The whole is subjected to the distillation; the unaltered triethylamine is distilled at 87° C.

to 91° C. The distillation is interrupted, the residue is mixed with dilute hydrocloric acid so as to give an acid reaction to congo paper, and subjected to a water-vapor distillation. The benzaldehyde is recovered nearly quantitatively from the distillate, while in the residue the hydrochloride of ethylamine is contained in a dissolved condition, from which 84 grams of the base are obtained by adding some alkali.

In the following claims secondary amines, tertiary amines, and mixtures thereof may be regarded as equivalents.

We claim:

1. The process which comprises causing an aromatic aldehyde to react upon a mixture of a primary and a secondary aliphatic amine, distilling the secondary amine off and decomposing the remaining compound of aldehyde and primary amine by boiling it with a strong mineral acid which has no oxidizing effect upon the amines.

2. The process which comprises causing an aldehyde of the benzene-series to react upon a mixture of a primary and a secondary aliphatic amine, distilling the secondary amine off and decomposing the remaining compound of aldehyde and primary amine by boiling it with an acid of the group consisting of sulphuric acid, hydrochloric acid, phosphoric acid.

3. The process which comprises causing benzaldehyde to react upon a mixture of a primary and a secondary aliphatic amine, distilling the secondary amine off and decomposing the remaining compound of aldehyde and primary amine by boiling it with sulphuric acid.

In testimony whereof, we affix our signatures.

OTTO NICODEMUS.
WALTER SCHMIDT.